US012551059B2

(12) United States Patent
Dionisio et al.

(10) Patent No.: US 12,551,059 B2
(45) Date of Patent: Feb. 17, 2026

(54) HOPPER FOR COFFEE GRINDER MACHINE EQUIPPED WITH A LOWER CLOSURE DEVICE TO SAVE BEANS AND COFFEE GRINDER MACHINE EQUIPPED WITH THIS HOPPER

(71) Applicant: LA MARZOCCO S.R.L., Scarperia (IT)

(72) Inventors: Andrea Dionisio, Scarperia (IT); Mario Donnini, Scarperia (IT)

(73) Assignee: LA MARZOCCO S.R.L., Scarperia (IT)

( * ) Notice: Subject to any disclaimer, the term of this patent is extended or adjusted under 35 U.S.C. 154(b) by 949 days.

(21) Appl. No.: 17/769,060

(22) PCT Filed: Oct. 16, 2020

(86) PCT No.: PCT/IB2020/059756
§ 371 (c)(1),
(2) Date: Apr. 14, 2022

(87) PCT Pub. No.: WO2021/074876
PCT Pub. Date: Apr. 22, 2021

(65) Prior Publication Data
US 2023/0284831 A1    Sep. 14, 2023

(30) Foreign Application Priority Data
Oct. 16, 2019   (IT) .......................... 102019000019088

(51) Int. Cl.
*A47J 42/06*     (2006.01)
*A47J 42/50*     (2006.01)

(52) U.S. Cl.
CPC .............. *A47J 42/06* (2013.01); *A47J 42/50* (2013.01)

(58) Field of Classification Search
CPC .................................. A47J 42/06; A47J 42/50
(Continued)

(56) References Cited

U.S. PATENT DOCUMENTS 852,603 A  *  5/1907  Hanlon ................... G01F 11/24
                                               222/368
1,022,774 A  *  4/1912  De Julio ................. G01F 11/24
                                               222/368
(Continued)

FOREIGN PATENT DOCUMENTS

AU     2009202486        1/2010
AU     2009202486 A1  *  1/2010  .............. A47J 42/50
(Continued)

OTHER PUBLICATIONS

International Search Report for PCT/IB2020/059756, mailed Jan. 28, 2021, 4 pages.
(Continued)

*Primary Examiner* — Jimmy Chou
(74) *Attorney, Agent, or Firm* — NIXON & VANDERHYE P.C.

(57) ABSTRACT

It is disclosed a hopper for a coffee grinder machine with a closing device comprising an actuation member, a shutter member, an actuation plane and a shutter plane, wherein the shutter plane is arranged below the actuation plane, wherein the shutter organ comprises: a single circular sector which is fixed with respect to the lower hopper portion, wherein the fixed circular sector comprises a central angle of less than 180° and a central hole; movable circular sectors pivoted at the central hole, wherein the movable circular sectors are rotatable between a first position in which the bottom opening is open and at least two of the sectors are substantially stacked one on top of the other in correspondence with the single fixed circular sector and a second position in which the lower opening is closed by the single fixed (Continued)

circular sector and by the mobile sectors arranged in a circumferential succession arrangement.

17 Claims, 8 Drawing Sheets

(58) Field of Classification Search
USPC .......................................................... 99/286
See application file for complete search history.

(56) References Cited

U.S. PATENT DOCUMENTS

| | | | | | |
|---|---|---|---|---|---|
| 1,560,013 | A * | 11/1925 | Angeletti | ................. | G01F 11/20 222/363 |
| 1,851,044 | A * | 3/1932 | Genovesi | ................. | A47F 1/035 222/360 |
| 1,863,133 | A * | 6/1932 | Ziedins | ................. | G01F 11/24 222/360 |
| 2,047,184 | A * | 7/1936 | Gray | ................. | G01F 11/24 222/360 |
| 2,104,332 | A * | 1/1938 | Rohde | ................. | G01F 11/24 222/363 |
| 2,187,046 | A * | 1/1940 | Mclean | ................. | A63F 5/02 273/144 A |
| 2,259,710 | A * | 10/1941 | Stern | ................. | A47G 19/34 222/50 |
| 2,475,381 | A * | 7/1949 | Erickson | ................. | B02C 11/04 222/260 |
| 2,489,925 | A * | 11/1949 | Omwake | ................. | B01J 8/002 422/219 |
| 2,533,449 | A * | 12/1950 | Fraser | ................. | G01F 11/24 222/364 |
| 2,539,283 | A * | 1/1951 | Strachan | ................. | G01F 11/24 222/363 |
| 2,575,967 | A * | 11/1951 | May | ................. | A47G 19/34 222/39 |
| 2,585,472 | A * | 2/1952 | Kennedy | ................. | B01J 8/002 406/67 |
| 2,652,935 | A * | 9/1953 | Messing | ................. | D21C 7/06 414/220 |
| 2,688,416 | A * | 9/1954 | Skretting | ................. | D21C 7/06 406/64 |
| 2,858,212 | A * | 10/1958 | Durant | ................. | D21C 7/06 406/67 |
| 2,869,638 | A * | 1/1959 | Sullivan | ................. | A01K 5/0291 222/650 |
| 2,920,796 | A * | 1/1960 | Field | ................. | G01F 11/24 222/337 |
| 2,943,556 | A * | 7/1960 | Egi | ................. | A47J 31/3614 99/302 R |
| 2,960,245 | A * | 11/1960 | Knapp | ................. | B65G 53/4633 406/67 |
| 3,033,164 | A * | 5/1962 | Evers | ................. | A01K 5/025 141/248 |
| 3,169,675 | A * | 2/1965 | Gutzmann | ................. | A47G 19/34 222/360 |
| 3,204,833 | A * | 9/1965 | Weitzner | ................. | G01F 11/24 222/363 |
| 3,231,105 | A * | 1/1966 | Easley, Jr. | ................. | B65G 53/4633 222/368 |
| 3,568,893 | A * | 3/1971 | Becker | ................. | G01F 11/24 222/363 |
| 3,603,001 | A * | 9/1971 | Arnold | ................. | F26B 11/026 55/432 |
| 3,613,549 | A * | 10/1971 | Champion | ................. | B65B 25/001 99/472 |
| 3,735,899 | A * | 5/1973 | Rollinson | ................. | G01F 11/24 222/368 |
| 3,830,357 | A * | 8/1974 | West | ................. | B65G 65/4881 198/525 |
| 3,870,199 | A * | 3/1975 | Dugger | ................. | A23G 3/203 222/327 |
| 3,940,033 | A * | 2/1976 | Brian | ................. | G01F 11/24 222/452 |
| 4,053,087 | A * | 10/1977 | Lack | ................. | G01F 11/24 222/359 |
| 4,162,751 | A * | 7/1979 | Hetland | ................. | G01F 11/024 222/293 |
| 4,180,188 | A * | 12/1979 | Aonuma | ................. | G01F 11/20 222/368 |
| 4,238,058 | A * | 12/1980 | Heth | ................. | G01F 11/24 29/463 |
| 4,244,705 | A * | 1/1981 | Seidl | ................. | C10J 3/34 48/77 |
| 4,268,205 | A * | 5/1981 | Vacca | ................. | B65G 53/4633 414/805 |
| 4,357,861 | A * | 11/1982 | Di Girolamo | ................. | A47J 31/401 366/195 |
| 4,376,499 | A * | 3/1983 | Ostergaard | ................. | A47F 1/03 222/362 |
| 4,383,545 | A * | 5/1983 | Becker | ................. | F16L 55/07 137/204 |
| 4,397,657 | A * | 8/1983 | Selep | ................. | C10J 3/30 414/220 |
| 4,427,135 | A * | 1/1984 | MacKay | ................. | G01F 11/24 222/368 |
| 4,473,092 | A * | 9/1984 | Becker | ................. | F16L 55/07 137/203 |
| 4,511,067 | A * | 4/1985 | Martin | ................. | G01F 11/24 222/230 |
| 4,569,463 | A * | 2/1986 | Pellegrino | ................. | A47G 19/34 222/434 |
| 4,619,379 | A * | 10/1986 | Biehl | ................. | A47F 1/035 222/243 |
| 4,732,387 | A * | 3/1988 | Elinski | ................. | A63F 11/0002 273/144 A |
| 4,768,683 | A * | 9/1988 | Gold | ................. | G01F 11/24 222/328 |
| 4,770,125 | A * | 9/1988 | Gold | ................. | A01K 5/0233 222/339 |
| 4,778,182 | A * | 10/1988 | Brignole | ................. | A63F 7/048 273/144 A |
| 4,823,993 | A * | 4/1989 | Siegel | ................. | B65G 53/4633 222/368 |
| 4,860,930 | A * | 8/1989 | Tu | ................. | G01F 11/24 222/231 |
| RE33,083 | E * | 10/1989 | Pellegrino | ................. | G01F 11/20 222/434 |
| 4,899,908 | A * | 2/1990 | Kardiak | ................. | A47F 3/02 222/638 |
| 4,957,219 | A * | 9/1990 | Robbins | ................. | G01F 11/24 222/39 |
| 5,020,550 | A * | 6/1991 | Uchiyama | ................. | A24B 3/182 131/296 |
| 5,044,837 | A * | 9/1991 | Schmidt | ................. | B65G 53/4633 406/128 |
| 5,052,288 | A * | 10/1991 | Marquez | ................. | G07F 17/0085 99/403 |
| 5,109,893 | A * | 5/1992 | Derby | ................. | B65B 1/26 141/10 |
| 5,110,008 | A * | 5/1992 | Moulding, Jr. | ................. | G07F 17/0092 221/268 |
| 5,169,036 | A * | 12/1992 | Tong | ................. | A47G 19/34 222/339 |
| 5,219,093 | A * | 6/1993 | Moulding, Jr. | ................. | B65G 47/1407 221/268 |
| 5,244,019 | A * | 9/1993 | Derby | ................. | B65B 1/26 222/452 |
| 5,303,672 | A * | 4/1994 | Morris | ................. | A01K 61/80 222/650 |
| 5,307,963 | A * | 5/1994 | Mitchell | ................. | G01F 11/22 416/220 R |
| 5,361,682 | A * | 11/1994 | Crolla | ................. | A47J 27/18 426/523 |
| 5,375,744 | A * | 12/1994 | Henderson | ................. | G01F 11/24 222/363 |
| 5,387,256 | A * | 2/1995 | Enomoto | ................. | A47J 31/42 99/287 |

(56) References Cited

U.S. PATENT DOCUMENTS

| | | | | |
|---|---|---|---|---|
| 5,413,256 A * | 5/1995 | Mitchell | G01F 11/24 | 222/368 |
| 5,465,650 A * | 11/1995 | Friedrich | A47J 31/42 | 99/290 |
| 5,544,995 A * | 8/1996 | Ogawa | B65G 53/4633 | 222/368 |
| 5,598,764 A | 2/1997 | Bambi | | |
| 5,615,830 A * | 4/1997 | Matsunaga | B05B 5/1683 | 239/668 |
| 5,685,460 A * | 11/1997 | Vlastuin | A47F 1/03 | 222/154 |
| 5,694,794 A * | 12/1997 | Jerg | A47L 15/4409 | 68/17 R |
| 5,707,198 A * | 1/1998 | Vind | B01J 8/003 | 414/221 |
| 5,823,401 A * | 10/1998 | Zgoda | G01F 11/22 | 222/444 |
| 5,826,754 A * | 10/1998 | Ishaya | A47F 1/03 | 222/413 |
| 5,845,561 A * | 12/1998 | Chigira | A47J 31/42 | 99/289 R |
| 5,865,095 A * | 2/1999 | Mulle | A47J 31/42 | 99/293 |
| 5,908,007 A * | 6/1999 | Duin | A01K 5/01 | 119/51.11 |
| 5,927,558 A * | 7/1999 | Bruce | G01F 11/24 | 222/444 |
| 5,992,299 A * | 11/1999 | Fong | A47J 31/42 | 99/290 |
| 6,045,009 A * | 4/2000 | Beirle | B65G 53/4633 | 414/220 |
| 6,095,032 A * | 8/2000 | Barnett | A47J 42/40 | 100/145 |
| 6,135,317 A * | 10/2000 | Ruelle | B01J 8/24 | 222/254 |
| 6,293,440 B1 * | 9/2001 | Weaver | G01F 11/263 | 222/363 |
| 6,338,423 B1 * | 1/2002 | Polon | B65G 53/4633 | 222/363 |
| 6,339,885 B1 | 1/2002 | Hillis | | |
| 6,339,985 B1 * | 1/2002 | Whitney | A47J 31/505 | 99/290 |
| 6,367,370 B1 * | 4/2002 | Sham | A47J 31/42 | 99/306 |
| 6,389,957 B1 * | 5/2002 | Sham | A47J 31/42 | 99/287 |
| 6,439,106 B1 * | 8/2002 | Sham | A47J 31/42 | 99/289 R |
| 6,467,431 B1 * | 10/2002 | Stietzel | A01K 61/85 | 119/215 |
| 6,488,174 B1 * | 12/2002 | Cho | A47F 1/10 | 221/266 |
| 6,708,599 B2 * | 3/2004 | Torigai | A47J 31/0573 | 99/305 |
| 6,766,924 B1 * | 7/2004 | Ophardt | G01F 11/24 | 222/368 |
| 6,779,691 B2 * | 8/2004 | Cheng | B65G 65/4881 | 222/368 |
| 6,789,503 B1 * | 9/2004 | Gao | A01K 5/0291 | 119/51.11 |
| 6,827,002 B1 * | 12/2004 | Lin | A47J 42/08 | 99/305 |
| D500,636 S * | 1/2005 | Levy | D7/589 | |
| 6,840,157 B2 * | 1/2005 | Wang | A47J 31/42 | 99/290 |
| D507,936 S * | 8/2005 | Gold | D7/589 | |
| 6,964,355 B2 * | 11/2005 | Landau | A47G 19/34 | 222/367 |
| 6,966,466 B2 * | 11/2005 | Jensen | B65G 53/4633 | 222/368 |
| 6,988,444 B1 * | 1/2006 | Pfeifer | A47J 31/42 | 99/290 |
| 7,013,795 B2 * | 3/2006 | Mulle | A47J 31/42 | 99/290 |
| 7,013,796 B2 * | 3/2006 | Smit | G01F 11/24 | 99/289 R |
| 7,057,722 B2 * | 6/2006 | Gehrlein | B30B 15/304 | 356/419 |
| 7,063,005 B1 * | 6/2006 | Sit | A47J 31/42 | 99/289 R |
| D531,457 S * | 11/2006 | Gold | D7/589 | |
| 7,201,098 B2 * | 4/2007 | Wang | A47J 31/42 | 99/290 |
| 7,243,867 B2 * | 7/2007 | Steckhan | A47J 31/42 | 241/34 |
| 7,273,005 B2 * | 9/2007 | Turi | A47J 42/16 | 99/275 |
| 7,350,455 B2 * | 4/2008 | Vetterli | A47J 31/42 | 99/280 |
| 7,686,042 B2 * | 3/2010 | Haimi | B65B 31/02 | 222/368 |
| 7,703,639 B2 * | 4/2010 | Landau | B65G 65/4881 | 222/138 |
| 7,731,063 B2 * | 6/2010 | Rusch | G01F 11/24 | 222/363 |
| 7,757,903 B2 * | 7/2010 | Schwartz | G01F 13/001 | 222/218 |
| 7,992,486 B2 | 8/2011 | Constantine | | |
| 8,047,408 B2 * | 11/2011 | Eaton | G01F 11/24 | 222/410 |
| 8,210,094 B2 * | 7/2012 | Marcotegui Goni | A47J 42/44 | 193/31 A |
| 8,327,753 B2 * | 12/2012 | White | A47J 31/56 | 99/289 R |
| 8,505,441 B2 | 8/2013 | Bambi | | |
| 8,534,507 B2 * | 9/2013 | Gronholm | G01F 11/24 | 141/369 |
| 8,783,164 B2 * | 7/2014 | Tanja | B65D 83/04 | 222/361 |
| 8,833,238 B2 * | 9/2014 | Hansen | A47J 31/0621 | 99/283 |
| 8,915,406 B2 * | 12/2014 | Hu | B65D 83/06 | 222/428 |
| 9,212,839 B2 * | 12/2015 | McCoy | A47G 19/32 | |
| 9,301,637 B2 | 4/2016 | Hoare | | |
| D761,624 S | 7/2016 | McLean | | |
| 9,392,900 B2 | 7/2016 | McLean | | |
| D780,500 S | 3/2017 | Bambi | | |
| D795,630 S | 8/2017 | McLean | | |
| D796,244 S | 9/2017 | McLean | | |
| 9,903,746 B2 * | 2/2018 | Rusch | B65D 83/775 | |
| 10,264,911 B2 | 4/2019 | McLean | | |
| 10,314,420 B2 * | 6/2019 | DePierro | A47J 31/404 | |
| 10,327,577 B2 * | 6/2019 | Lenzi | A47J 42/50 | |
| 10,349,772 B1 | 7/2019 | Fedele | | |
| 10,398,255 B2 | 9/2019 | Constantine | | |
| 10,512,364 B2 * | 12/2019 | Chen | A23F 3/06 | |
| 10,588,322 B2 * | 3/2020 | Hamon | A21C 9/04 | |
| 10,687,660 B2 | 6/2020 | Gatti et al. | | |
| 10,881,242 B2 | 1/2021 | Dionisio et al. | | |
| 10,912,418 B2 | 2/2021 | Zernhelt | | |
| 11,020,316 B2 * | 6/2021 | Park | B65D 83/0409 | |
| 11,033,460 B2 * | 6/2021 | Park | B65D 55/02 | |
| 11,076,715 B1 | 8/2021 | Mohammad | | |
| 11,103,104 B2 | 8/2021 | Bakke et al. | | |
| 11,122,927 B2 | 9/2021 | Bianchi et al. | | |
| 11,224,202 B2 * | 1/2022 | Baxter | A01K 5/0291 | |
| 11,503,947 B2 | 11/2022 | Della Pietra et al. | | |
| 11,503,957 B2 * | 11/2022 | Valsecchi | A47J 42/50 | |
| 11,744,226 B2 * | 9/2023 | Tsai | A01K 5/0275 | 119/51.01 |
| 11,772,879 B2 * | 10/2023 | Park | B65D 83/0427 | 221/175 |
| 11,812,896 B2 * | 11/2023 | Guyatt | A47J 42/50 | |
| 12,084,298 B2 * | 9/2024 | Chlebovec | B65G 65/48 | |
| 2002/0038605 A1 * | 4/2002 | Ikuta | A47J 47/01 | 99/348 |
| 2002/0129712 A1 * | 9/2002 | Westbrook | A47J 31/44 | 99/302 R |

(56) References Cited

U.S. PATENT DOCUMENTS

| | | | |
|---|---|---|---|
| 2003/0039515 A1* | 2/2003 | Salley, Jr. | B65G 53/4633 406/122 |
| 2003/0079611 A1* | 5/2003 | Panzo | A23L 29/30 99/275 |
| 2003/0110953 A1* | 6/2003 | Mazzer | A47J 42/40 99/286 |
| 2004/0025703 A1* | 2/2004 | Ming | A47J 31/42 99/286 |
| 2004/0129229 A1* | 7/2004 | Blais | A01K 5/0291 119/56.1 |
| 2005/0098586 A1* | 5/2005 | Jensen | B65G 53/4633 222/367 |
| 2005/0279219 A1* | 12/2005 | Turi | A47J 31/42 99/286 |
| 2006/0027609 A1* | 2/2006 | Landau | G01F 11/18 222/434 |
| 2007/0290003 A1* | 12/2007 | Morin | A47J 31/404 222/325 |
| 2008/0060527 A1* | 3/2008 | Battani | A47J 27/18 99/356 |
| 2008/0093391 A1* | 4/2008 | Schwartz | G01F 13/001 222/368 |
| 2008/0098901 A1* | 5/2008 | Lee | A47J 42/50 99/286 |
| 2010/0024657 A9* | 2/2010 | Nosler | A47J 31/007 426/433 |
| 2010/0095852 A1* | 4/2010 | Remo | A47J 31/42 99/287 |
| 2011/0094392 A1 | 4/2011 | Bianchi | |
| 2011/0185908 A1* | 8/2011 | Berto | G01F 11/24 222/71 |
| 2012/0024160 A1* | 2/2012 | Van Os | A47J 31/42 426/115 |
| 2012/0070546 A1* | 3/2012 | Tanja | A47J 31/42 426/115 |
| 2012/0240777 A1* | 9/2012 | Righetti | A47J 42/40 99/280 |
| 2012/0266754 A1 | 10/2012 | Bambi | |
| 2013/0091802 A1* | 4/2013 | Bentley | A47J 42/50 53/111 R |
| 2013/0112081 A1* | 5/2013 | Nelissen | A47J 31/404 99/289 R |
| 2014/0137746 A1 | 5/2014 | Moran et al. | |
| 2014/0305970 A1* | 10/2014 | Musumeci | B65D 83/775 222/232 |
| 2015/0041491 A1* | 2/2015 | Muller | A61J 1/03 222/361 |
| 2015/0257581 A1* | 9/2015 | Marchi | A47J 31/42 99/295 |
| 2015/0359388 A1* | 12/2015 | Landau | A47J 47/01 222/1 |
| 2016/0159555 A1* | 6/2016 | Park | B65D 83/0427 221/175 |
| 2016/0192809 A1 | 7/2016 | Bakke | |
| 2017/0079466 A1* | 3/2017 | Chalk | A47J 31/0626 |
| 2017/0188755 A1* | 7/2017 | Wallis | A47J 42/50 |
| 2018/0055275 A1 | 3/2018 | Bianchi et al. | |
| 2018/0192811 A1 | 7/2018 | Dionisio | |
| 2018/0271319 A1 | 9/2018 | Gatti et al. | |
| 2018/0303284 A1 | 10/2018 | Gatti | |
| 2018/0360257 A1 | 12/2018 | Dionisio et al. | |
| 2019/0075964 A1 | 3/2019 | Della Pietra et al. | |
| 2020/0093323 A1 | 3/2020 | Dionisio et al. | |
| 2020/0138233 A1 | 5/2020 | Shalev | |
| 2020/0315401 A1* | 10/2020 | Deuber | A47J 42/46 |
| 2020/0352390 A1 | 11/2020 | Ceotto | |
| 2020/0375388 A1 | 12/2020 | MacFarlane | |
| 2021/0015296 A1 | 1/2021 | Arreola | |
| 2021/0153692 A1* | 5/2021 | Lissandron | A47J 42/40 |
| 2021/0204748 A1 | 7/2021 | Della Pietra et al. | |
| 2021/0315415 A1 | 10/2021 | Bianchi et al. | |
| 2021/0361119 A1* | 11/2021 | Valsecchi | A47J 42/50 |
| 2021/0400909 A1* | 12/2021 | Tsai | A01K 5/02 |
| 2022/0007875 A1 | 1/2022 | Della Pietra et al. | |
| 2022/0047120 A1 | 2/2022 | Dionisio | |
| 2022/0061586 A1 | 3/2022 | Guglielmino et al. | |
| 2022/0095839 A1 | 3/2022 | Dionisio et al. | |
| 2022/0117442 A1 | 4/2022 | Dionisio | |
| 2022/0133080 A1 | 5/2022 | Mohammad | |
| 2023/0097467 A1* | 3/2023 | Deuber | A47J 31/42 241/248 |
| 2023/0175877 A1* | 6/2023 | Vine | G01F 15/001 222/368 |

FOREIGN PATENT DOCUMENTS

| | | |
|---|---|---|
| DE | 10 2007 008900 | 8/2008 |
| DE | 10 2007 008911 | 8/2008 |
| JP | 57-194178 | 12/1982 |

OTHER PUBLICATIONS

Written Opinion of the ISA for PCT/IB2020/059756, mailed Jan. 28, 2021, 7 pages.

U.S. Appl. No. 17/769,256, filed Apr. 14, 2022, entitled "Steam Wand and Method for Frothing Milk".

U.S. Appl. No. 17/769,619, filed Apr. 15, 2022, entitled "Coffee Grinder With Device for Filter Holder or Filter Detection and Method for Detecting a Filter Holder or Filter".

Canadian Office Action dated Jun. 3, 2024 issued in Canadian Patent Application No. 3,156,323, 4 pp.

Japanese Office Action dated Dec. 5, 2023 issued in Japanese Patent Application No. 2022-522335 and English translation, 10 pp.

* cited by examiner

HOPPER FOR COFFEE GRINDER MACHINE EQUIPPED WITH A LOWER CLOSURE DEVICE TO SAVE BEANS AND COFFEE GRINDER MACHINE EQUIPPED WITH THIS HOPPER

This application is the U.S. national phase of International Application No. PCT/IB2020/059756 filed Oct. 16, 2020, which designated the U.S. and claims priority to IT patent application No. 102019000019088 filed Oct. 16, 2019, the entire contents of each of which are hereby incorporated by reference.

BACKGROUND

The present invention relates to the field of machines for grinding coffee beans. Such a machine for grinding coffee grains may be a separate machine or may be integrated into a coffee beverage making machine. Such a machine for grinding coffee grains is also known simply as "coffee grinder machine", "coffee grinder" or "grinder".

The present invention more particularly relates to a hopper for a coffee grinder machine with a lower closure device configured to reduce the amount of coffee wasted during the hopper removal operation. The present invention also relates to a coffee grinder machine comprising said hopper.

STATE OF THE ART

As is known, for the preparation of an espresso coffee, a certain amount of ground coffee, usually called dose, is used. The dose of ground coffee is loaded into a filter, typically cup-shaped, open at the top and with a micro-perforated bottom. Typically, the coffee dose is pressed into the filter to form a powdered coffee puck. The filter is in turn supported by a filter holder configured to removably engage a dispensing group of an espresso coffee machine. The espresso coffee is obtained by passing hot water under pressure through the powdered coffee puck.

The coffee powder is obtained by a coffee grinding machine. In a known coffee grinding machine, the coffee grains are ground by passing them through grinding members. Grinding members of the flat, conical or cylindrical type are known. Typically, the grinding members of a coffee grinding machine comprise a fixed member and a member rotating with respect to the fixed member. For example, in a coffee grinder with conical mill, one mill remains fixed, namely stationary, while the other is rotated by a motor.

The coffee grains to be ground are typically loaded into a container, called hopper, disposed above the grinding members. Typically, the coffee grains reach the grinding members by gravity.

The hopper has an upper opening, usually provided with a lid for closing it, and a lower opening so that the coffee grains to be ground can reach the grinding members.

The hopper can be removed from the coffee machine for various reasons. For example, to clean the grinding means and/or the hopper or to empty the hopper and replace the coffee mixture contained therein. Or, to store the unground coffee in a cool and dry environment (for example in a refrigerator) when a rather long period of inactivity is foreseen (for example at night, at the end of a working day).

Since the hopper, when it is to be separated from the coffee grinding machine, can be at least partially filled with coffee beans, a lower closure device is provided. Before removing the hopper, the bartender closes the lower opening and prevents the coffee beans in the hopper from falling down and being wasted.

DE102007008911A1, DE102007008900A1 and D3 AU2009202486A1 disclose hoppers with closure systems.

SUMMARY OF THE INVENTION

The Applicant has carefully observed the known lower closure devices of the hoppers for coffee grinder machines.

The Applicant has observed that the known lower closure devices of the hoppers for coffee-milling machines perform the lower closure of the hopper at a position which sacrifices a non-small quantity of coffee beans.

In other words, the Applicant has observed that between the grinding members and the lower closure device of the hopper there remains a not negligible amount of grains not yet ground. Such grains are wasted (perhaps by grinding them "idly", i.e. without necessity) or they can be partially gathered with great difficulty by the bartender.

The waste of coffee, as well as of any food, is ethically unacceptable but it is also to be avoided for economic reasons. The Applicant has in fact calculated that the amount of coffee beans wasted each time the hopper is removed is not less than about 20 g. Considering that the hopper can be removed one or more times a day, the annual waste of coffee is of a few kilograms.

The Applicant has faced the problem of limiting the waste of coffee when the hopper is removed and of providing an aperture which is larger than the known arrangements. According to the Applicant, a problem lies in the fact that the known closure devices act in a position far from the grinding members. Typically, the closure occurs at a distance of a few centimeters from the grinding members. It is precisely the volume of coffee between the grinding means and the closing device that is lost.

According to the Applicant, the problem of reducing wasted coffee when the hopper of a coffee grinding machine is removed can be solved by providing a closure device with an actuation member defining an actuation plane and a shutter member defining a shutter plane. wherein the drive plane is not coincident with the shutter plane and the actuation plane is higher than the shutter plane.

The relative position between the operating plane and the shutter plane is evaluated in a straight vertical position of the hopper, with the opening for loading the coffee beans to be ground facing upwards.

Preferably, the actuation is performed by a rotational movement about a vertical or substantially vertical axis.

In this way, the actual closing plane (shutter plane) is in the vicinity of the grinding members. Therefore, the volume of coffee between the top of the grinding members and the actual closure plane is significantly reduced compared to the known systems, thus reducing the amount of coffee wasted and unused when the hopper is disassembled.

According to a first aspect, the present invention provides a hopper for a coffee grinder machine comprising:
  a main container body for containing coffee beans to be ground, wherein the main body comprises an upper loading opening;
  a lower hopper portion comprising a bottom opening to allow coffee beans to reach grinding organs,
  a closing device for closing the bottom opening, wherein the closing device comprises an actuating member, a shutter member, an actuation plane and a shutter plane, wherein the shutter plane is arranged below the actuation plane, wherein the shutter member comprises:

a single circular sector fixed with respect to the lower hopper portion, wherein the single fixed circular sector has a triangular shape, wherein the single fixed circular sector comprises, namely forms, a central angle at the vertex less than 180° and a central hole at the vertex;

mobile circular sectors hinged to the single fixed circular sector at the central hole of the single fixed circular sector, wherein the mobile circular sectors are rotatable between a first position in which the bottom opening is open and at least two of the mobile circular sectors are substantially stacked one on top of the other in correspondence with the single fixed circular sector and a second position in which the bottom opening is closed by the single fixed circular sector and by the mobile circular sectors arranged in a circumferential succession arrangement.

Basically, the mobile sectors move, that is, they open up like a folding fan. The expression "they move like a folding fan" when is referred to the sectors of the shutter member means that there are circular sectors (also called petals or cloves) that are hinged in the center, i.e., near the tip. The circular sectors can all be stacked on top of each other; in this case, the opening is all open except for the part where the circular sectors are stacked. The circular sectors can be arranged in circumferential succession in order to close the opening. In this position, two circumferentially successive sectors may possibly overlap for a minimum part, in correspondence with their respective circumferentially adjacent edges. Intermediate positions of partial closing (or opening) can also be provided.

According to embodiments, the single fixed circular sector comprises, namely forms, a central angle at the vertex less than 90°.

According to embodiments, the single fixed circular sector comprises a top surface which protrudes towards an inner volume of the hopper, preferably forming a double chute.

According to embodiments, the closing device comprises a tubular body projecting downwards from the hopper at the bottom opening and a cup-shaped body and wherein the shutter plane substantially corresponds to a bottom wall of the cup-shaped body.

According to embodiments, the bottom wall of the cup-shaped body comprises a bottom circular sector, wherein the bottom circular sector has a triangular shape comprising a central angle at the vertex of less than 180°, for instance less than 90°, wherein the bottom circular sector of the cup-shaped body is hinged and rotatable with respect to the single fixed circular sector.

According to embodiments, the shutter member comprises a first movable sector and a second movable sector which can be caused to rotate through a rotation of the bottom circular sector of the cup-shaped body.

According to embodiments, the bottom circular sector of the cup-shaped body comprises a groove which extends for an arc of circumference, wherein the first movable sector comprises a first tooth and wherein the groove is configured to cooperate with the first tooth of the first mobile sector.

According to embodiments, the first movable sector further comprises a second tooth configured to cooperate with the second movable sector.

According to embodiments, at least along a portion of the thickness of the tubular body there is a slit.

According to embodiments, at least along a portion of the thickness of the tubular body there is a barrier edge projecting downwards.

According to embodiments, the cup-shaped body comprises a ring ferrule for rotating the cup-shaped body with respect to the cylindrical body.

According to another aspect, there is provided a coffee grinder machine comprising a machine body, a grinding chamber with grinding members and a hopper, wherein said hopper comprises:

a main container body for containing coffee beans to be ground, wherein the main body comprises an upper loading opening;

a lower hopper portion comprising a bottom opening to allow coffee beans to reach grinding members, a closing device for closing the bottom opening, wherein the closing device comprises an actuating member, a shutter member, an actuation plane and a shutter plane, wherein the shutter plane is arranged below the actuation plane, wherein the shutter member comprises:

a single circular sector fixed with respect to the lower hopper portion, wherein the single fixed circular sector has a triangular shape, wherein the single fixed circular sector comprises, namely forms, a central angle at the vertex less than 180° and a central hole at the vertex;

mobile circular sectors hinged to the single fixed circular sector at the central hole of the single fixed circular sector, wherein the mobile circular sectors are rotatable between a first position in which the bottom opening is open and at least two of the mobile circular sectors are substantially stacked one on top of the other in correspondence with the single fixed circular sector and a second position in which the bottom opening is closed by the single fixed circular sector and by the mobile circular sectors arranged in a circumferential succession arrangement.

According to embodiments, the shutter plane is at a distance d from the grinding members less than or equal to about 15 mm.

According to embodiments, the shutter plane is at a distance D greater than about 20 mm from the actuation plane.

According to embodiments, the closing device is configured to be actuated through a rotational movement about a vertical axis.

BRIEF DESCRIPTION OF THE DRAWINGS

A detailed description of the invention is now given by way of non-limiting example, to be read with reference to the accompanying figures, in which.

DETAILED DESCRIPTION

Figure 1:
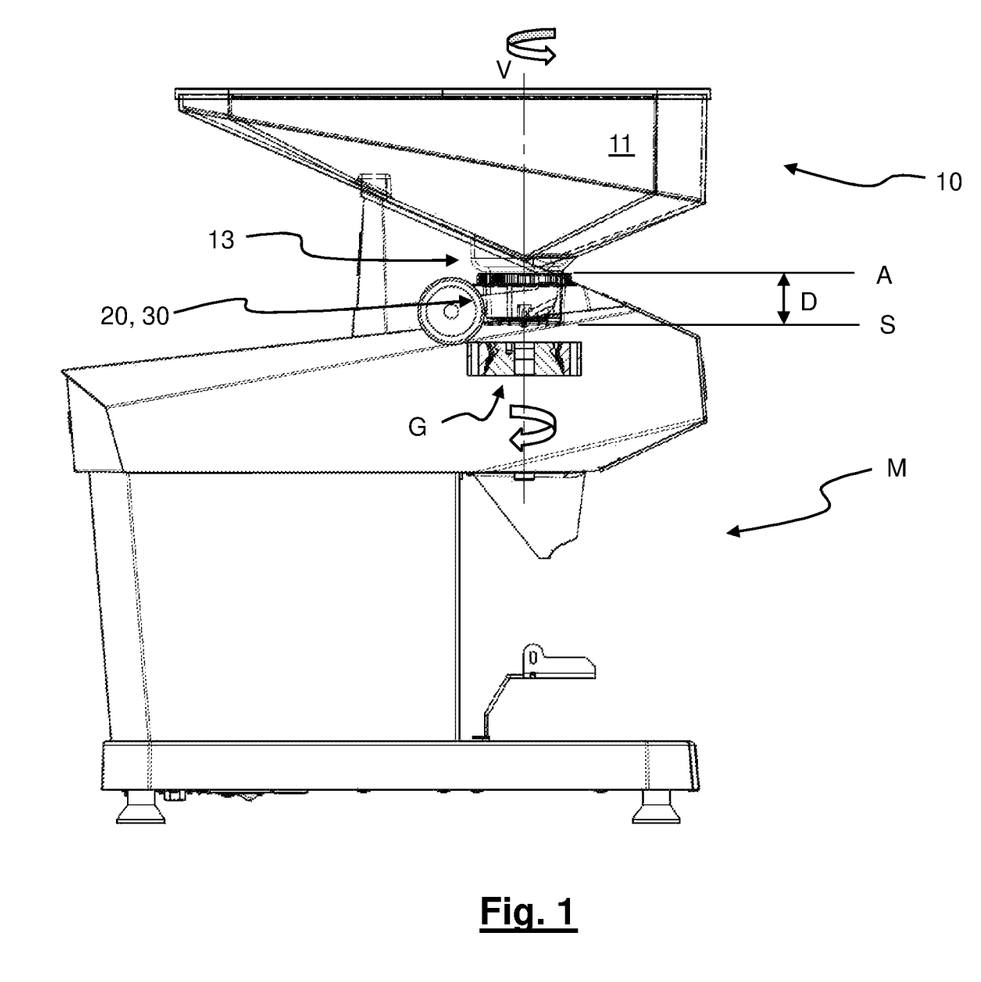
FIG. 1 is a schematic representation of a coffee grinder machine with a hopper according to an embodiment of the present invention.

In FIG. 1, by way of example only, a coffee grinding machine M is shown with a hopper 10 mounted in its upper part.

Figure 2A:
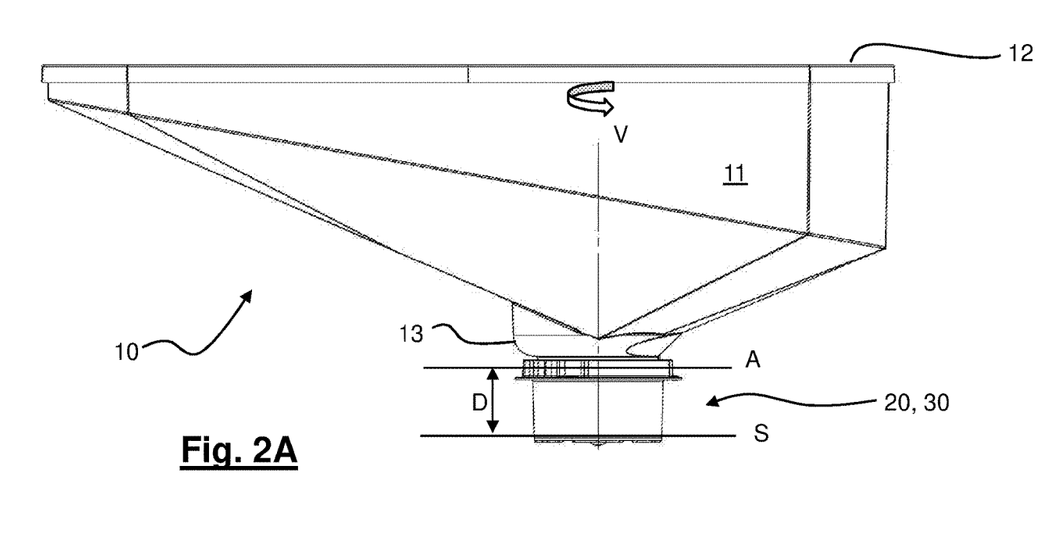
FIG. 2A is a lateral view of a hopper with the shutter plane (actual closing plane) of the bottom opening which is in a lower position with respect to the operating plane of the closure device.
Figure 2B:
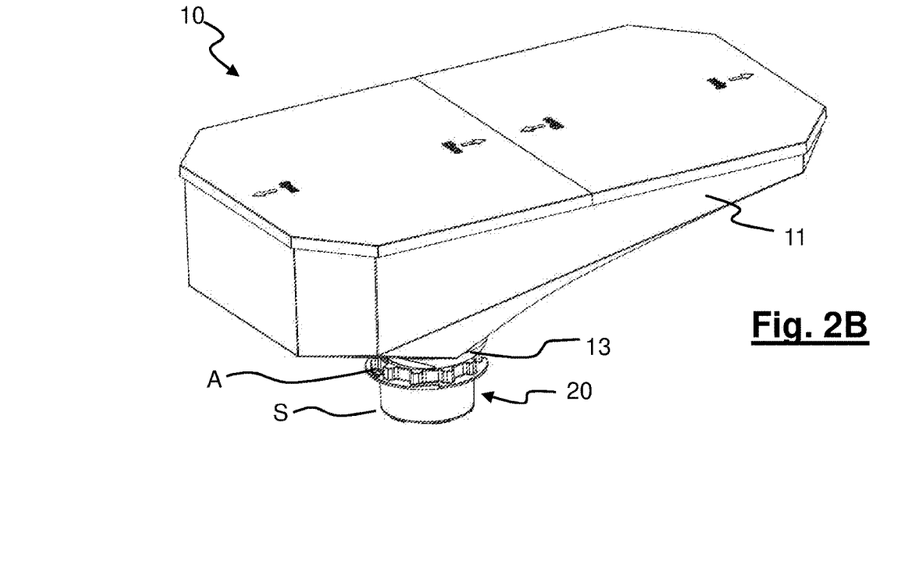
FIG. 2B is an axonometric view of the hopper of FIG. 2 with its lid closed.
Figure 3:
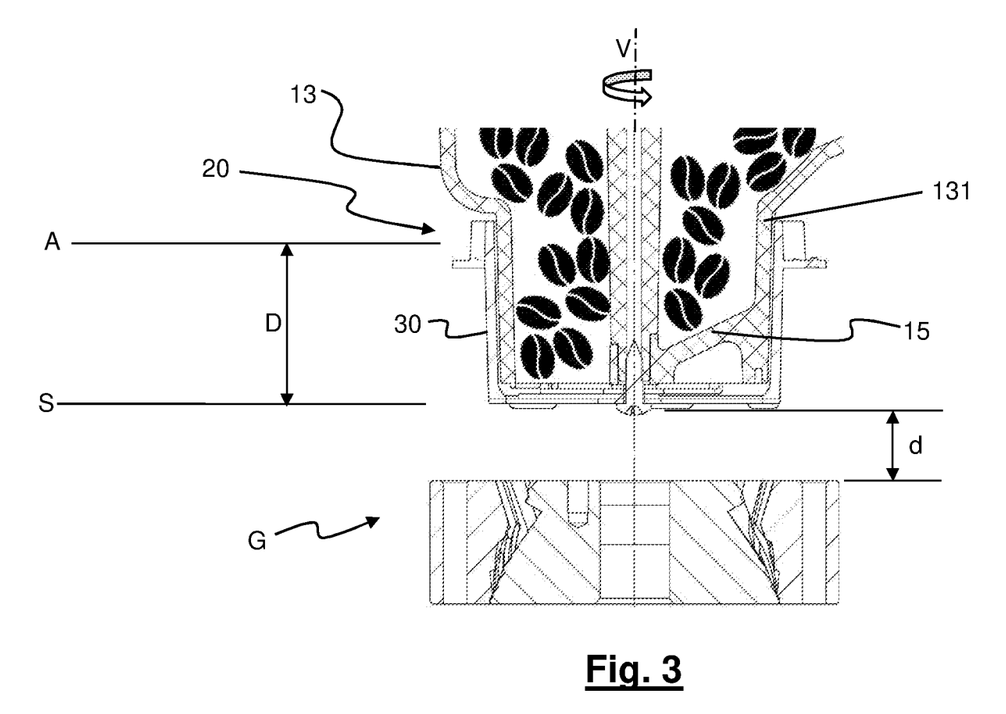
FIG. 3 is a cross-section of an embodiment of the device for closing the lower opening of a hopper for a coffee grinder machine.

FIGS. 2A and 2B illustrate in very schematic terms the principle underlying the present invention. According to the present invention, the closure of the bottom opening of the hopper 10 does not take place at the control member which closes the lower opening of the hopper. In fact, the actual closing of the hopper 10 takes place at a shutter plane S which is lower than the actuation plane A Advantageously, the actual closure takes place in a position closer to the grinding members G. In this way, the volume of coffee beans already released from the hopper 10 and therefore not usable is virtually zero or in any case small. Closing (and reopening) takes place through a rotation movement around a vertical or substantially vertical axis V, by rotating clockwise and/or counterclockwise as shown by the arrows in FIG. 1

According to advantageous embodiments, the closure of the bottom opening of the hopper 10 takes place through a rotation movement.

Preferably, the rotation is manual, i.e. performed by a human operator when necessary. Alternatively, it can be controlled automatically, for example by means of an electric motor or the like. In this case, a sensor (for example a proximity or contact sensor) can be provided which sensor commands closure if the hopper 10 is raised even a small distance. In this way, the risk of the operator forgetting to close the opening of the hopper at the bottom before separating it from the coffee grinder M is avoided.

According to the present invention, the closing device 20 closes the bottom opening with a "folding fan-like" movement, contrary to known solutions with butterfly closure.

Unlike known solutions, in the present embodiment there are circular sectors that the barista can rotate from an open position in which the sectors are substantially all stacked, namely superimposed, to a closed position in which each sector closes a part of the opening and together, on the whole, the sectors substantially close it completely. This movement resembles that of a folding fan in that it passes from a folded rest position to a fully unfolded position.

Figure 6:
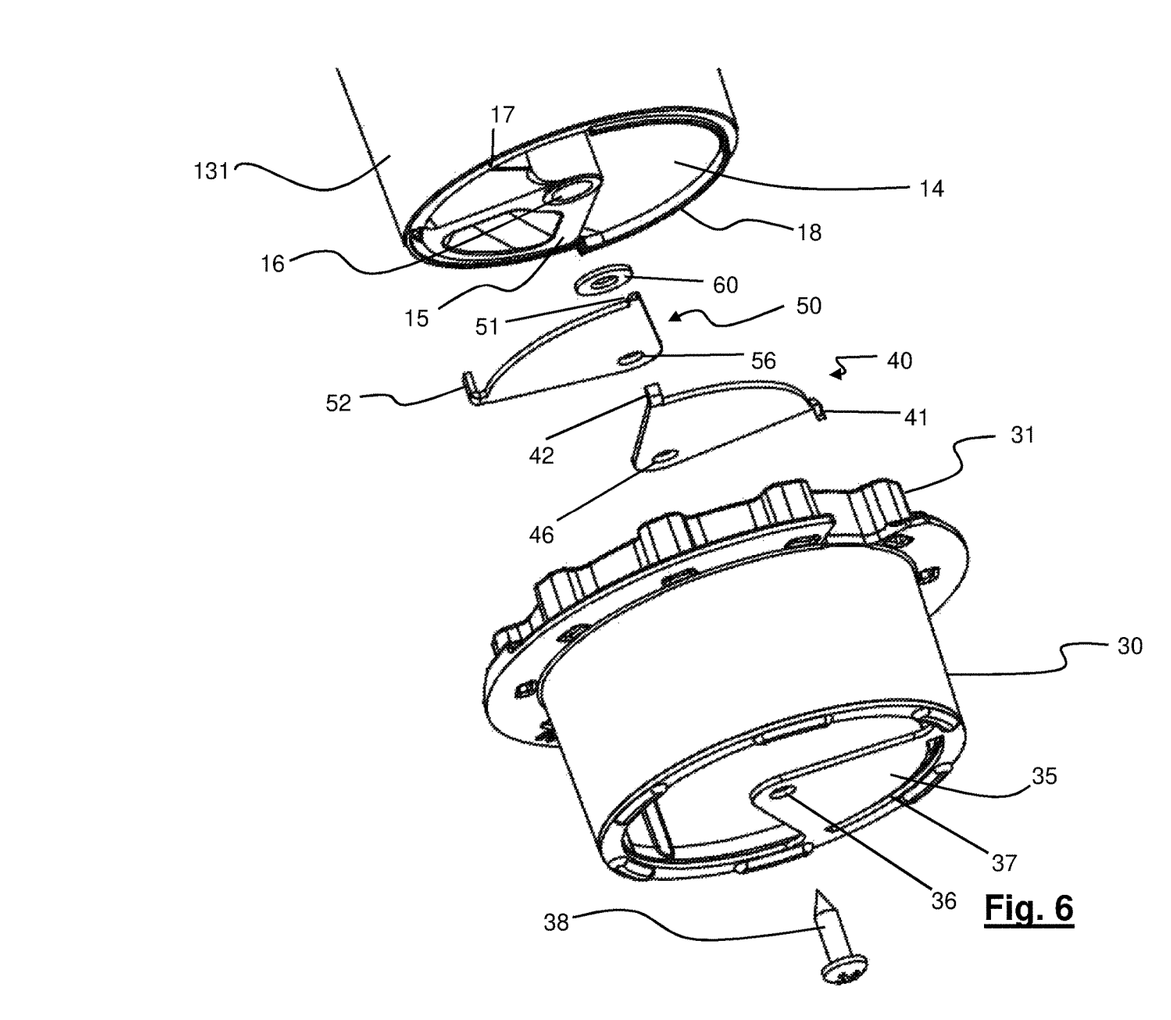
FIG. 6 is an exploded view of the closing device.
Figure 7:
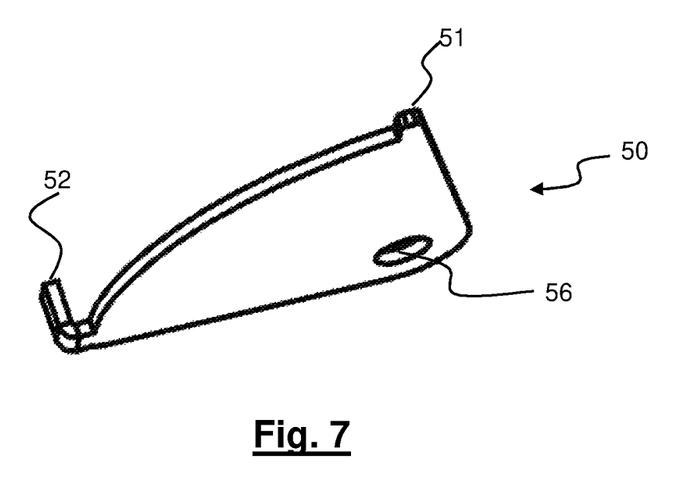
FIGS. 7 and 8 show two movable sectors of the closing device.
Figure 8:
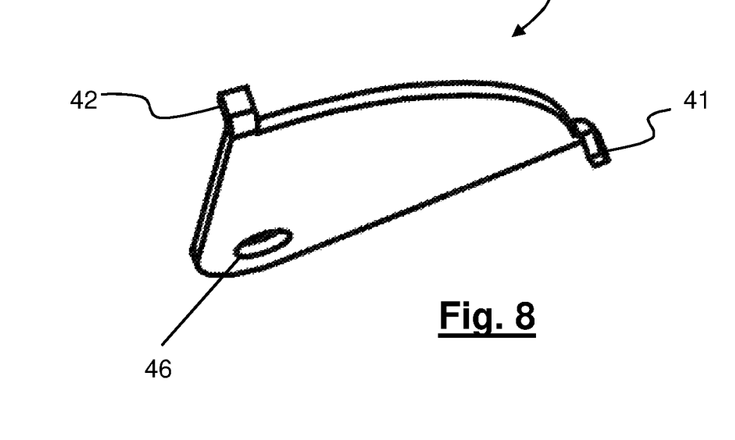

With reference to the various Figures, in particular with reference to the exploded view of FIG. 6, the bottom 13 of the hopper 10 is shaped so as to include a tubular part (or tubular body) 131 projecting downwards. The bottom opening of the hopper 10 is the tubular part 131. The tubular part 131 is preferably with a circular section.

The tubular part 131 is substantially completely open but is closed by a fixed sector 15. The fixed sector 15 of the tubular part 131 comprises a base in the form of a circular arc along a portion of the edge of the tubular part 131. The fixed sector 15 of the tubular body 131 comprises a central hole 16. As shown in FIG. 6, the fixed sector 15 of the tubular part 131 comprises (1) radial edges which form a central angle at a vertex less than 180° and (2) the circular arc which is subtended by the central angle of the vertex and which connects the radial legs. Preferably, the central hole 16 is threaded.

Fixed sector 15 has a central angle α (alpha) less than 180°. In embodiments, the angle α at the center is approximately equal to 90° or less than 90°. For example it is between 80° and 85°, for example 84°.

Preferably, the fixed sector 15 of the tubular body 131 is flat in its lower face. Preferably, the fixed sector of the tubular body has a shape protruding upwards, towards the inside of the hopper 10. As will become clear in the following, the protruding shape favors the sliding of the coffee beans towards the opening and prevents the beans from lock in correspondence with the fixed sector 15.

When the hopper 10 is made of plastic material, the fixed sector 15 can be substantially hollow internally as shown in the various figures.

For reasons that will be clarified below, a slit 17 is preferably present along a portion of the thickness of the cylindrical body 131.

Preferably, for reasons which will be clarified below, at least along a portion of the thickness of the cylindrical body 131 there is an edge 18 projecting downwards.

According to the present invention, the closing device 20 of the bottom opening of the hopper comprises a cup-shaped body 30 which cooperates with the tubular body 131.

The cup-shaped body 30 has an internal section substantially corresponding to the external section of the cylindrical body 131 in terms of shape and dimensions. In its upper part, the cup-shaped body 30 comprises a ring 31 with teeth to facilitate the grip (and therefore the rotation) by the barista.

Similarly to the cylindrical body 131, the cup-shaped body 30 comprises a bottom circular sector 35. The bottom circular sector 35 of the cup-shaped body 30 is substantially triangular, with the base along a portion of the edge of the cup-shaped body 30. The circular bottom sector 35 of the cup-shaped body comprises a central hole 36. Preferably, the central hole 36 is a through hole.

Preferably, the bottom circular sector 35 of the cup-shaped body 30 is flat.

Preferably, the bottom circular sector 35 includes a groove 37 with a circular arc that develops near the edge of the cup-shaped body 30.

In the exploded view of FIG. 6 other elements of the closing device 20 according to the invention are visible. In particular, two mobile circular sectors 40, 50, also called "petals" are visible.

The cup-shaped body 30 is coupled to the tubular body 131 by means of a screw 38 which passes through the central hole 36 of the cup-shaped body 30 and screws into the central hole 26 of the tubular body 20. The petals 40, 50, and possibly a washer 60, are interposed between the two bodies 20, 30.

Each petal 40, 50 has a roughly triangular shape with a curved base.

Each petal 40, 50 comprises a central hole 46, 56, preferably through hole.

Preferably, each petal 40, 50, comprises a pair of teeth 41, 42, 51, 52 at the ends of the curved base.

A first petal 40, also called "lower petal", comprises a first tooth 41 facing downwards, configured to engage the groove 37 in the bottom sector 35 of the cup-shaped body 30. The first tooth 41 is substantially at 90° with respect to the lower face of the first petal 40. The second tooth 42 is substantially at 90° with respect to the upper face of the first petal 40.

A second petal 50, also called "upper petal", comprises a third tooth 51 facing radially, configured to cooperate with the second tooth 42 of the lower petal 40. The fourth tooth 52 is substantially at 90° with respect to the upper face of the upper petal 50.

In the configuration in which the bottom opening is open, the bottom sector 35 of the cup-shaped body 30 is substantially superimposed on the fixed sector 25 of the tubular body 131 protruding from the hopper 10. In this open position, the upper petal 50 and the petal lower 40 are also superimposed. This configuration is shown, for example, in FIGS. 5, 5A and 5B.

Figure 5:
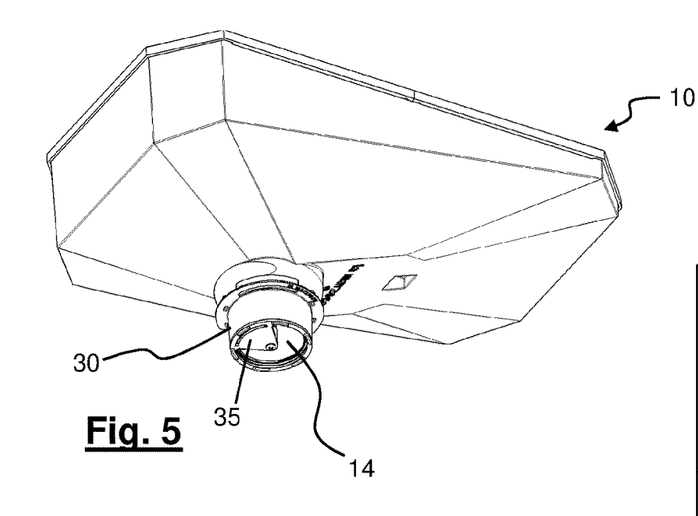
FIG. 5 is an axonometric view from below of the hopper with the closing device in the completely open position.
Figure 5A:
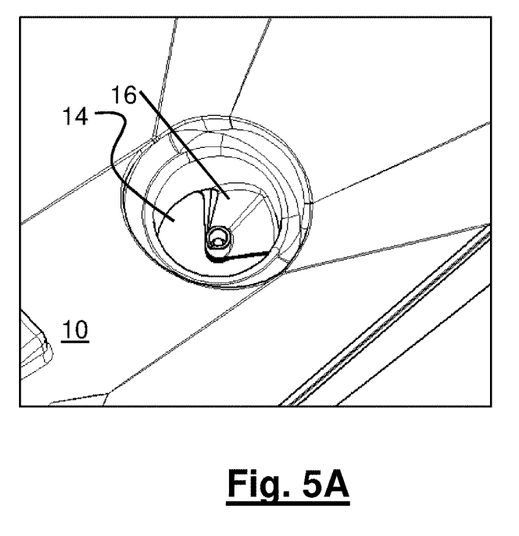
FIG. 5A is a view of the fully open closing device seen from inside the hopper.
Figure 5B:
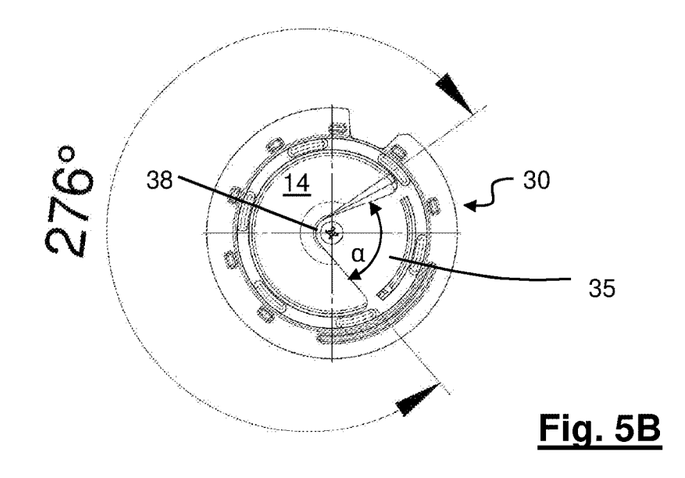
FIG. 5B is a plan view of the fully open closing device, seen from below, showing the maximum opening angle.

As shown in FIG. 5B, thanks to the folding fan solution, the opening angle is much higher than the opening angle of the known solutions, typically 180°. In the present embodiment, the opening angle is preferably greater than 270°, for example 276° as in the representation of FIG. 5B.

Starting from the open position (FIGS. 5, 5A and 5B), to close the bottom opening 14 the barista rotates the cup-shaped body 30 and therefore the bottom sector 35. During the first part of this rotation, the first tooth 41 of the lower petal 40 runs through the groove 37 of the bottom sector 35. Continuing in the rotation of the cup-shaped body 30, the lower petal 40 is dragged by the engagement between the first tooth 41 and the end of the groove 37. Continuing again with the rotation of the cup-shaped body 30 with respect to the tubular body 131, the lower petal 40 rotates the upper petal 50 since the second tooth 42 engages the third tooth 51. In turn, the second tooth 42 and the fourth tooth 52 slide in the groove 37 of cylindrical body 131.

As mentioned above, at least along a portion of the thickness of the cylindrical body there is an edge 18 projecting downwards. This edge 18 constitutes a barrier for closing the bottom opening 14 in a precise way, preventing large amounts of coffee or coffee powder from escaping when the cup-shaped body 30 and/or the petals 40, 50 are in certain positions.

Figures 4, 4A:
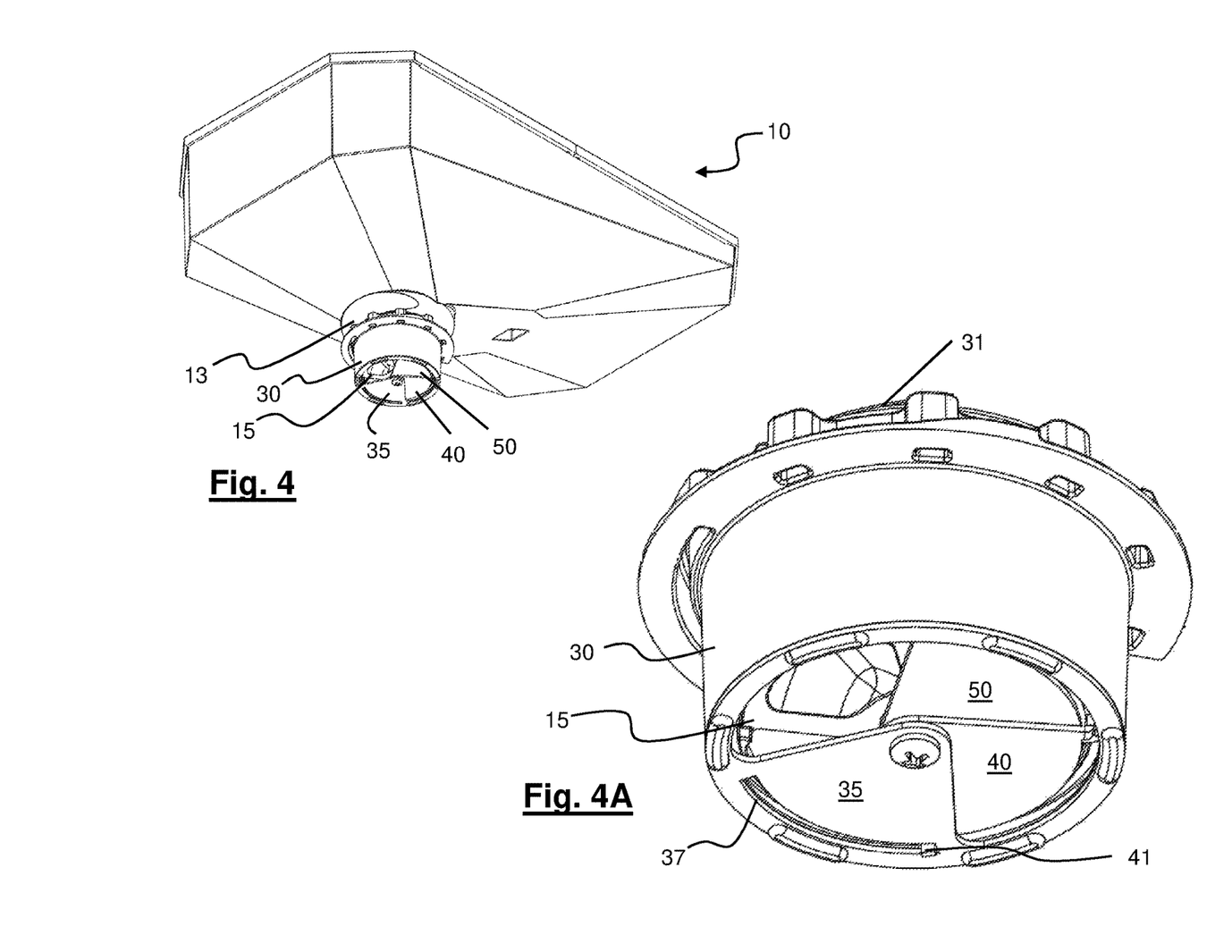
FIG. 4 is an axonometric view from the bottom of the hopper with the closure device in its fully closed position.
FIG. 4A is an axonometric view from the bottom of the hopper with the closure device in its fully closed position.

FIGS. 4 and 4A show the closing device of the bottom opening 14 completely closed.

FIGS. 5, 5 and 5B instead show the closing device of the bottom opening 14 completely open.

Figures 9, 10:
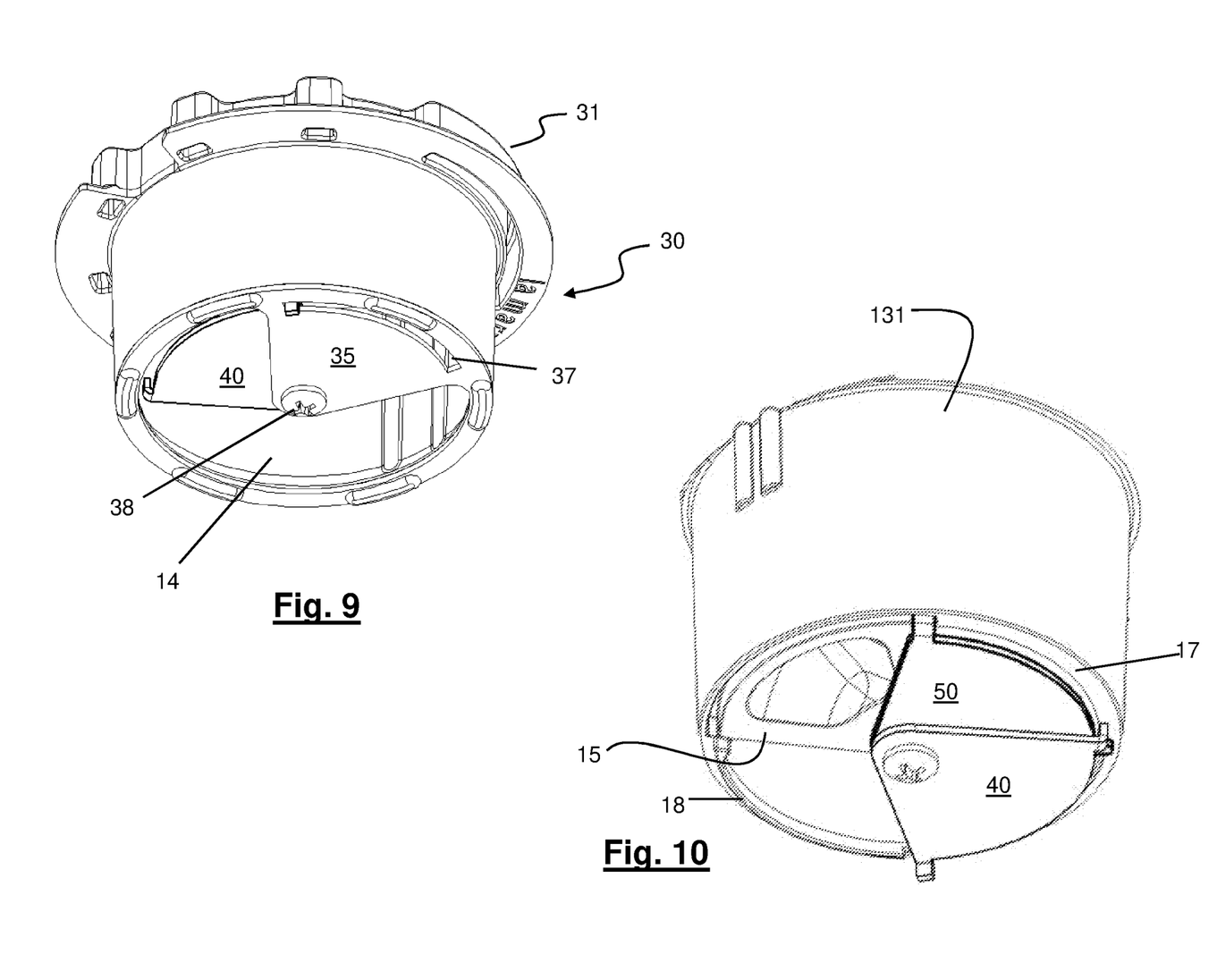
FIG. 9 is an axonometric view of the closing device in a partial closing position.
FIG. 10 is an axonometric view of the bottom of the hopper with two movable sectors to close the bottom opening.

FIG. 9 shows the closing device of the bottom opening 14 partially open. To illustrate the engagement of the second tooth 42 and of the fourth tooth 52 in the groove 37, in FIG. 10 the cup-shaped body 30 has not been shown.

Advantageously, therefore, according to the present invention, a device for closing the bottom opening of a hopper is provided which greatly limits the waste of coffee beans and at the same time provides a significantly wider opening than the opening of the known solutions. The percentage of greater opening with respect to known solutions can also be greater than 50%. In fact, one typically passes from an opening angle of about 180° to an opening angle of over 270°.

The invention claimed is:

1. A hopper for a coffee grinder machine comprising:
a main container body for containing coffee beans to be ground, wherein the main body comprises an upper loading opening;
a lower hopper portion comprising a bottom opening to allow coffee beans to reach grinding members,
a closing device for closing the bottom opening, wherein the closing device comprises an actuating member, a shutter member, an actuation plane and a shutter plane, wherein the shutter plane is arranged below the actuation plane,
wherein the shutter member comprises:
a single circular sector fixed with respect to the lower hopper portion, wherein the single fixed circular sector comprises (1) radial legs which form a central angle at a vertex less than 180° and (2) a circular arc which is subtended by the central angle of the vertex and which connects the radial legs, and wherein the single circular sector comprises a central hole at the vertex;
mobile circular sectors hinged to the single fixed circular sector at the central hole of the single fixed circular sector, wherein the mobile circular sectors are rotatable between a first position in which the bottom opening is open and at least two of the mobile circular sectors are substantially stacked one on top of the other in correspondence with the single fixed circular sector and a second position in which the bottom opening is closed by the single fixed circular sector and by the mobile circular sectors arranged in a circumferential succession arrangement.

2. The hopper of claim 1, wherein the single fixed circular sector comprises a central angle at the vertex less than 90°.

3. The hopper of claim 1, wherein the single fixed circular sector comprises a top surface which protrudes towards an inner volume of the hopper.

4. The hopper of claim 1, wherein the closing device comprises a tubular body projecting downwards from the hopper at the bottom opening and a cup-shaped body and wherein the shutter plane substantially corresponds to a bottom wall of the cup-shaped body.

5. The hopper of claim 4, wherein the bottom wall of the cup-shaped body comprises a bottom circular sector, wherein the bottom circular sector has a triangular shape comprising a central angle at the vertex of less than 180°, wherein the bottom circular sector of the cup-shaped body is hinged and rotatable with respect to the single fixed circular sector.

6. The hopper of claim 5, wherein the bottom circular sector has a central angle at the vertex of less than 90°.

7. The hopper of claim 5, wherein the shutter member comprises a first movable sector and a second movable sector which can be caused to rotate through a rotation of the bottom circular sector of the cup-shaped body.

8. The hopper of claim 7, wherein the bottom circular sector of the cup-shaped body comprises a groove which extends for an arc of circumference, wherein the first movable sector comprises a first tooth and wherein the groove is configured to cooperate with the first tooth of the first mobile sector.

9. The hopper of claim 8, wherein the first movable sector further comprises a second tooth configured to cooperate with the second movable sector.

10. The hopper of claim 4, wherein at least along a portion of the thickness of the tubular body there is a slit.

11. The hopper of claim 4, wherein at least along a portion of the thickness of the tubular body there is a barrier edge projecting downwards.

12. The hopper of claim 4, wherein the cup-shaped body comprises a ring ferrule for rotating the cup-shaped body with respect to the tubular body.

13. A coffee grinder machine comprising a machine body, a grinding chamber with grinding members and a hopper, wherein the hopper comprises:

a main container body for containing coffee beans to be ground, wherein the main body comprises an upper loading opening;

a lower hopper portion comprising a bottom opening to allow coffee beans to reach grinding members, a closing device for closing the bottom opening, wherein the closing device comprises an actuating member, a shutter member, an actuation plane and a shutter plane, wherein the shutter plane is arranged below the actuation plane, wherein the shutter member comprises:

a single circular sector fixed with respect to the lower hopper portion, wherein the single fixed circular sector has a triangular shape, wherein the single fixed circular sector comprises a central angle at the vertex less than 180° and a central hole at the vertex;

mobile circular sectors hinged to the single fixed circular sector at the central hole of the single circular sector, wherein the mobile circular sectors are rotatable between a first position in which the bottom opening is open and at least two of the mobile circular sectors are substantially stacked one on top of the other in correspondence with the single fixed circular sector and a second position in which the bottom opening is closed by the single fixed circular sector and by the mobile circular sectors arranged in a circumferential succession arrangement.

14. The coffee grinder machine of claim 13, wherein the shutter plane is at a distance from the grinding members less than or equal to 15 mm.

15. The coffee grinder machine of claim 13, wherein the shutter plane is at a distance greater than 20 mm from the actuation plane.

16. The coffee grinder machine of claim 13, wherein the closing device is configured to be actuated through a rotational movement about a vertical axis.

17. The hopper of claim 3, wherein the top surface of the single fixed circular sector comprises a double chute.

* * * * *